(12) United States Patent  
Cui et al.

(10) Patent No.: US 7,911,654 B2
(45) Date of Patent: Mar. 22, 2011

(54) ESTIMATING LIGHT OUTPUT OF A LAMP IN A SCANNER

(75) Inventors: Chengwu Cui, Lexington, KY (US); Larry L. Kiser, Scottsville, NY (US)

(73) Assignee: Lexmark International, Inc., Lexington, KY (US)

( * ) Notice: Subject to any disclaimer, the term of this patent is extended or adjusted under 35 U.S.C. 154(b) by 1295 days.

(21) Appl. No.: 11/217,815

(22) Filed: Sep. 1, 2005

(65) Prior Publication Data

US 2007/0046930 A1    Mar. 1, 2007

(51) Int. Cl.
*H04N 1/00* (2006.01)
*H04N 1/46* (2006.01)
(52) U.S. Cl. .......... 358/406; 358/504
(58) Field of Classification Search .......... 358/401, 358/404, 406, 444, 471, 474, 475, 494, 497, 358/500, 501, 504, 505, 509, 523
See application file for complete search history.

(56) References Cited

U.S. PATENT DOCUMENTS

| | | | | |
|---|---|---|---|---|
| 5,278,674 | A * | 1/1994 | Webb et al. | 358/474 |
| 5,907,742 | A * | 5/1999 | Johnson et al. | 399/51 |
| 6,028,681 | A * | 2/2000 | Gray et al. | 358/475 |
| 6,256,111 | B1* | 7/2001 | Rijavec | 358/1.9 |
| 6,327,047 | B1* | 12/2001 | Motamed | 358/1.15 |
| 6,330,083 | B1* | 12/2001 | Nabeshima et al. | 358/474 |
| 6,516,101 | B1* | 2/2003 | Tsai | 382/321 |
| 7,433,097 | B2* | 10/2008 | Spears | 358/504 |

FOREIGN PATENT DOCUMENTS

WO    WO 03/058587 A2 *   7/2003

* cited by examiner

*Primary Examiner* — Benny Q Tieu
*Assistant Examiner* — Eric A Rust

(57) ABSTRACT

A method of estimating light output of a lamp in a scanner prior to the lamp being fully warmed-up. The method includes measuring a spectral characteristic of light emitted by a lamp in a scanner at a time $t_0$ prior to the lamp being fully warmed-up and estimating the light output of the lamp at a time $t_1$ based on the measured spectral characteristic, wherein $t_1$ is greater than $t_0$. A method of scanning, as well as a scanning apparatus is also provided.

16 Claims, 3 Drawing Sheets

ESTIMATING LIGHT OUTPUT OF A LAMP IN A SCANNER

FIELD OF INVENTION

The present invention generally relates to apparatus and methods for scanning. In particular, the present invention is directed to scanning apparatus and methods wherein lamp light output during lamp warm-up may be predicted based on the spectral characteristics of light emitted by the lamp.

BACKGROUND OF THE INVENTION

Photographs, transparencies, documents and other images are often electronically scanned to produce a digital representation of the image. Typically, the image is scanned with light in order to generate a digital representation of the image.

In image scanning devices, one or more light-emitting devices are used as the exposure lamp for purposes of scanning. In many desktop scanners, one or more cold cathode fluorescent lamps (CCFLs) are employed. CCFLs have many advantages over other types of light sources, including high intensity, long life, price and high efficiency. However, compared to other light sources, CCFLs require a longer period of time to warm-up. Typically, a CCFL may take from ten seconds to over sixty seconds to approach maximum light output. As such, waiting for a CCFL to become fully warmed-up can delay scanning, particularly when scanner calibration is to be performed prior to the first scan following activation (i.e., initial powering on or resuming from suspend or sleep mode) of the lamp.

Scanner calibration is a well-established process directed to reducing the defects resulting from illumination and sensor array sensitivity non-uniformity. Typically, a scanner is calibrated to a surface of known color (e.g., a white surface), often referred to as a calibration strip. The calibration strip is scanned, and the response signals from the sensors in the scanner are analyzed. Since the calibration strip is a known color, the calibration scan may be used to determine the spectral characteristics (e.g., color) and intensity of light emitted from the lamp, and compute an appropriate gain to be used during subsequent scanning. Such calibration is necessary since, among other things, the spectral characteristics and intensity of emitted light will change over the life of the lamp. In most scanners, however, calibration is not performed until the lamp is fully warmed-up, thus further delaying the first scan following lamp activation.

SUMMARY OF THE INVENTION

One embodiment of the present invention provides a method of estimating light output of a lamp in a scanner prior to the lamp being fully warmed-up, thereby allowing scanning of an image to be performed prior to the lamp being fully warmed-up. This method includes measuring a spectral characteristic of light emitted by a lamp in a scanner at a time $t_0$ prior to the lamp being fully warmed-up and estimating the light output of the lamp at a time $t_1$ based on the spectral characteristic, wherein $t_1$ is greater than $t_0$. This method may further include determining a warm-up state of the lamp for time $t_0$ by comparing the measured spectral characteristic to stored data correlating lamp warm-up state and spectral characteristic. The light output of the lamp may be estimated at a time $t_1$ by determining a warm-up state of the lamp for time $t_1$ based on the warm-up state for time $t_0$ and the difference between $t_1$ and $t_0$, and thereafter obtaining the estimated light output at time $t_1$ by comparing the warm-up state of the lamp for time $t_1$ to stored data correlating lamp warm-up state and light output.

The spectral characteristic used in the exemplary method may comprise the ratio of detected light of a first band of wavelengths to detected light of a second band of wavelengths. For example, the first and second band of wavelengths may be individually chosen from red, blue and green bands of wavelengths. In one particular embodiment, the spectral characteristic which is measured and used to measure light output is the ratio of detected light of a red band of wavelengths and detected light of a blue band of wavelengths (either the ratio of red to blue or the ratio of blue to red). The step of measuring a spectral characteristic of light emitted by the lamp may include imaging a calibration target of known color (such as a calibration strip). It is also contemplated that the spectral characteristic may be determined by directly measuring the light emitted from the lamp (i.e., without scanning a target of known color).

The present invention also provides a method of scanning using a scanning apparatus, which includes: energizing a lamp of the scanning apparatus; measuring a spectral characteristic of light emitted by the lamp at a time $t_0$ prior to the lamp being fully warmed-up; performing a scan at a time $t_1$ prior to the lamp being fully warmed-up and acquiring image data from the scan, wherein $t_1$ is greater than $t_0$; estimating the light output of the lamp at a time $t_1$ based on the spectral characteristic; and modifying the image data using the estimated light output. The light output of the lamp may be estimated in the manner previously described. The step of modifying the image data using the estimated light output may include adjusting a gain applied to the acquired image data.

Another embodiment of the present invention is an apparatus for scanning. This apparatus includes: a lamp for emitting light; a photosensor for detecting light emitted by the lamp; and a memory which stores first and second sets of lamp calibration data. The first set of lamp calibration data comprising data correlating lamp warm-up state and a spectral characteristic of light emitted by the lamp, and the second set of lamp calibration data comprising data correlating lamp warm-up state and light output of the lamp. In one particular embodiment, the lamp includes a CCFL. The spectral characteristic in the stored data may include the ratio of detected light of a first band of wavelengths to detected light of a second band of wavelengths. For example, the spectral characteristic may include the ratio of detected light of a red band of wavelengths and detected light of a blue band of wavelengths.

Other features of the embodiments of the present invention will be apparent in light of the description of the present invention embodied herein.

BRIEF DESCRIPTION OF THE SEVERAL VIEWS OF THE DRAWINGS

The following detailed description of specific embodiments of the present invention may be better understood when read in conjunction with the following drawings, where like structure is indicated with like reference numerals and in which.

DETAILED DESCRIPTION

In the following detailed description of illustrative embodiments, reference is made to the accompanying drawings that form a part of the description, and in which are shown by way of illustration, and not by way of limitation, specific embodiments in which the present invention may be practiced. It is to be understood that other embodiments may be utilized and that logical, mechanical and electrical changes may be made without departing from the spirit and scope of the present invention. Particularly, while the specific embodiments discussed herein describe the use of a CCFL, it will be appreciated that the methods and image scanning devices of the present invention may employ other types of scanning lamps as well.

The present invention is directed to methods and apparatus for calibrating a scanner before the lamp is fully warmed-up, thereby shortening the warm-up time before a first scan can be performed. Lamps used in desktop scanners, particularly CCFLs, may not exhibit stable light output and spectral characteristics until they are fully warmed-up. After the CCFL is turned on (i.e., activated), its light output (intensity) will gradually increase from low to high and then stabilize. In addition, the spectral characteristics of the light may also change. Typically, when a CCFL is first activated, the color of emitted light will initially tend towards the yellow/red portion of the spectrum. As the CCFL warms-up, the color will move towards the blue portion of the spectrum. Because of these changes, it may be difficult to properly calibrate the scanner before the lamp is fully warmed-up and stabilized. In addition, light output does not change monotonically. For example, the intensity of emitted light will initially increase rapidly during the initial stage of warm-up. However, later during warm-up, light intensity may increase less rapidly and may even decrease at certain points during the warm-up process. This characteristic makes it difficult to reliably predict light output based on a calibration performed prior to the lamp being fully warmed-up and stabilized.

Applicants have discovered that the spectral characteristics (e.g., color) of light emitted from the lamp in a scanner during lamp warm-up may be used to determine the warm-up status of the lamp. This warm-up status may then be used to predict the light output (intensity) at a subsequent time in the warm-up process. In this manner, the scanner lamp may be calibrated prior to the lamp being fully warmed-up, thereby allowing an image to be scanned prior to the lamp being fully warmed-up and stabilized.

Figure 1:
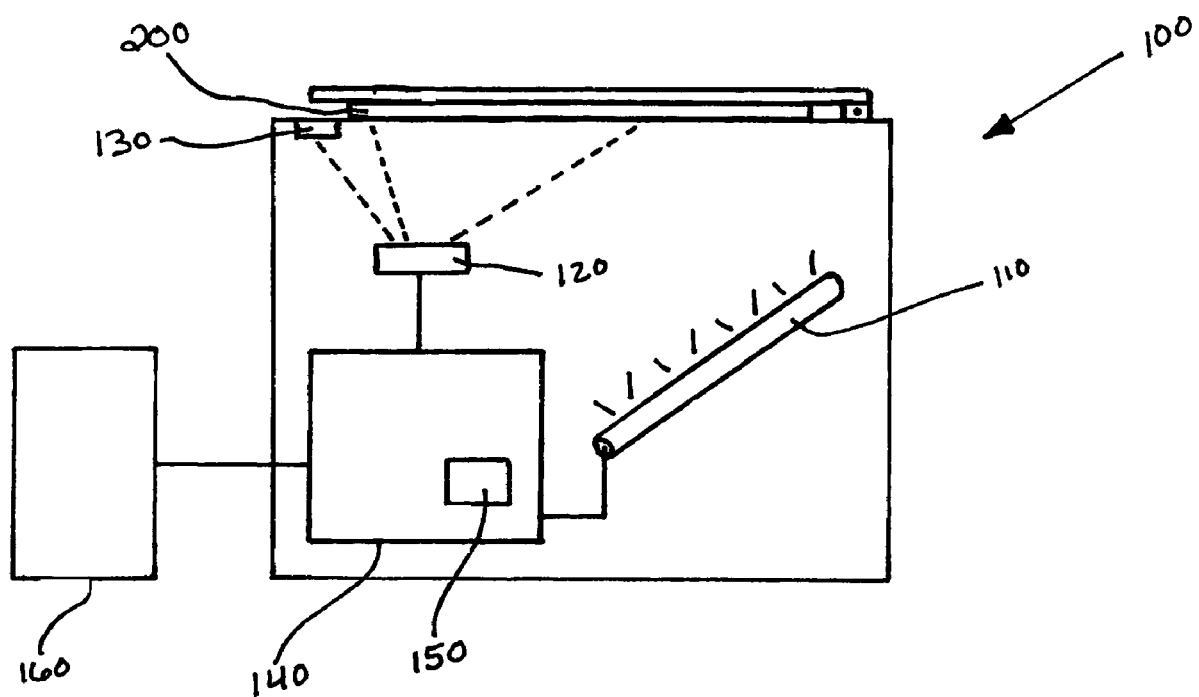
FIG. 1 is a schematic illustration of a scanning apparatus according to an embodiment of the present invention.

FIG. 1 is a schematic illustration of a scanning apparatus 100 according to an exemplary embodiment of the present invention. Scanning apparatus 100 generally comprises a light source 110, a sensor 120, a calibration strip 130, and a control system 140. Scanning apparatus 100 may be used to scan an image from an image storing medium 200, such as a transparency or paper. Scanning using scanning apparatus 100 generally comprises applying light to the image storing medium 200 and detecting light which is reflected from and/or transmitted through the image storing medium 200. While FIG. 1 depicts an exemplary flatbed scanner 100 which scans by detecting light reflected from the image storing medium, the present invention is not limited to such forms of scanning apparatus. For example, the scanning apparatus 100 may be a sheet-fed scanner. The scanning apparatus 100 may also be a standalone device or a scanning component of a multifunction device which has the ability to perform other functions such as printing, copying, or faxing. Additional optics may be positioned between light source 110 and the image to be scanned in order to, for example, illuminate the image more uniformly.

Scanning apparatus 100 may also include a control system 140 which processes data acquired by sensor 120. Control system 140 may include a processor (e.g., a CPU), as well as memory 150 which, among other things, stores calibration data described further herein. Control system 140 processes image data provided by sensor 120 in order to generate a digital signal containing scanned image data. Control system 140 may also be in communication with a computer system 160, such as a personal computer, such that image data may be transmitted to computer system 160 for further processing, manipulation, printing, display, storage and the like. Computer system 160 may comprise any device which is capable of processing data in accordance with one or more instructions and generally includes a CPU and memory. Examples include a personal computer, workstation, server, mainframe, embedded system, microprocessor, discrete logic system, and the like. Computer system 160 processes data received from scanning apparatus 100 in order to generate a digital representation of the original image. It should be noted that computer system 160 need not be physically separate from scanning apparatus 100, since computer system 160 may be physically provided in scanning apparatus 100 (e.g., as part of control system 140).

Scanning apparatus 100 may employ any of a variety of light responsive sensors 120 which generate an electrical signal in response to light. Suitable sensors 120 include, for example, charge coupled devices (CCDs). Sensor 120 may include one or more individual sensor elements, each of which is light responsive. A CCD sensor, for example, will include a one or more individual photosensitive elements such that each sensor element of the CCD acquires image data corresponding to a discrete, typically very small, region of the image being scanned. A plurality of individual sensor elements may be arranged in an array to allow for the scanning of an entire area of an image at one time. Alternatively, a plurality of individual sensor elements may be arranged in one or more rows such that the CCD sensor may acquire image data on a line by line (rather than area) basis. In one particular embodiment, sensor 120 may comprise a CCD sensor having a trilinear array of photosensitive elements—three parallel rows of individual sensor elements, wherein each row is sensitive to visible light of a particular color. For example, one row of sensor elements is responsive to red light, another row is responsive to green light, and the third row is responsive to blue light. Such a CCD sensor will provide three channels of image data—red, green and blue channels. In other words, for any point on an image being scanned, sensor 120 will provide a red signal, a green signal and a blue signal, which together represent the spectral characteristic of light reflected from that point on the image.

A variety of light sources may be used in scanning apparatus 100. In the exemplary embodiment of FIG. 1, light source 110 comprises a cold cathode fluorescent lamp (a "CCFL"). One or more CCFLs may be incorporated into scanning apparatus 100. Since the light output (intensity) from CCFL 110 may vary, particularly during lamp warm-up, scanning apparatus 100 is configured to be calibrated after the lamp is powered-on (i.e., activated). Calibration is performed by measuring the spectral characteristics of light emitted from CCFL 110. In the exemplary embodiment, such calibration is performed by scanning calibration strip. Light reflected from calibration strip 130 is detected by sensor 120, and the spectral characteristics (e.g., color) of the light is determined by control system 140. As further described herein, the spectral characteristics of the light are used to determine the warm-up status of CCFL 110. When an image is subsequently scanned, the light output of CCFL 110 is estimated using stored data which correlates CCFL warm-up status and light output. The estimated light output at the time of image scanning is then used to adjust the gain of the control system 140 in order to compensate for the estimated lamp output during scanning.

In one embodiment, light output and color data during warm-up, as a function of warm-up status (e.g., warm-up time), may be determined and stored (e.g., in a look-up table). Light color may be a value calculated on the basis of two or more of the signals provided by sensor 120. For example, the lamp color data may simply be the ratio of the red and blue signals ("R/B", or alternatively "B/R") provided by sensor 120 when the calibration strip 130 is scanned during lamp warm-up. It will be appreciated that color data representative of the color of light emitted by CCFL 110 may be characterized in a variety of other manners, such as a ratio calculated from any two of the red, blue and green signals provided by sensor 120.

In order to predict lamp output (i.e., the intensity of emitted light) based on spectral characteristics, calibration data is collected and stored (e.g., in memory 150). Calibration data may be collected by a scanner manufacturer and stored in memory 150 for later retrieval and use. Alternatively, or in addition thereto, calibration data may be periodically collected by scanning apparatus 100 and stored in memory 150, automatically and/or at periodic times initiated by the user. In this manner, the calibration data may be updated over the life of lamp 110. Calibration data may include a first data set correlating lamp warm-up state (in seconds) and a spectral characteristic (e.g., R/B ratio) of light emitted by lamp 110, as well as a second data set correlating lamp warm-up state and light output (i.e., intensity) of lamp 110. By way of example, such data may be stored in one or more look-up tables. Alternatively, calibration data may be used to establish one or more mathematical functions providing the desired correlations.

In a particular embodiment, calibration data may include a first look-up table correlating the R/B values (i.e., ratios of red to blue signals from a scan of calibration strip 130) to the warm-up state (e.g., in seconds) and a second table correlating light output to warm-up status. Once this lamp characterization data has been determined, the look-up tables may be used for subsequent calibration during lamp warm-up.

Figure 2:
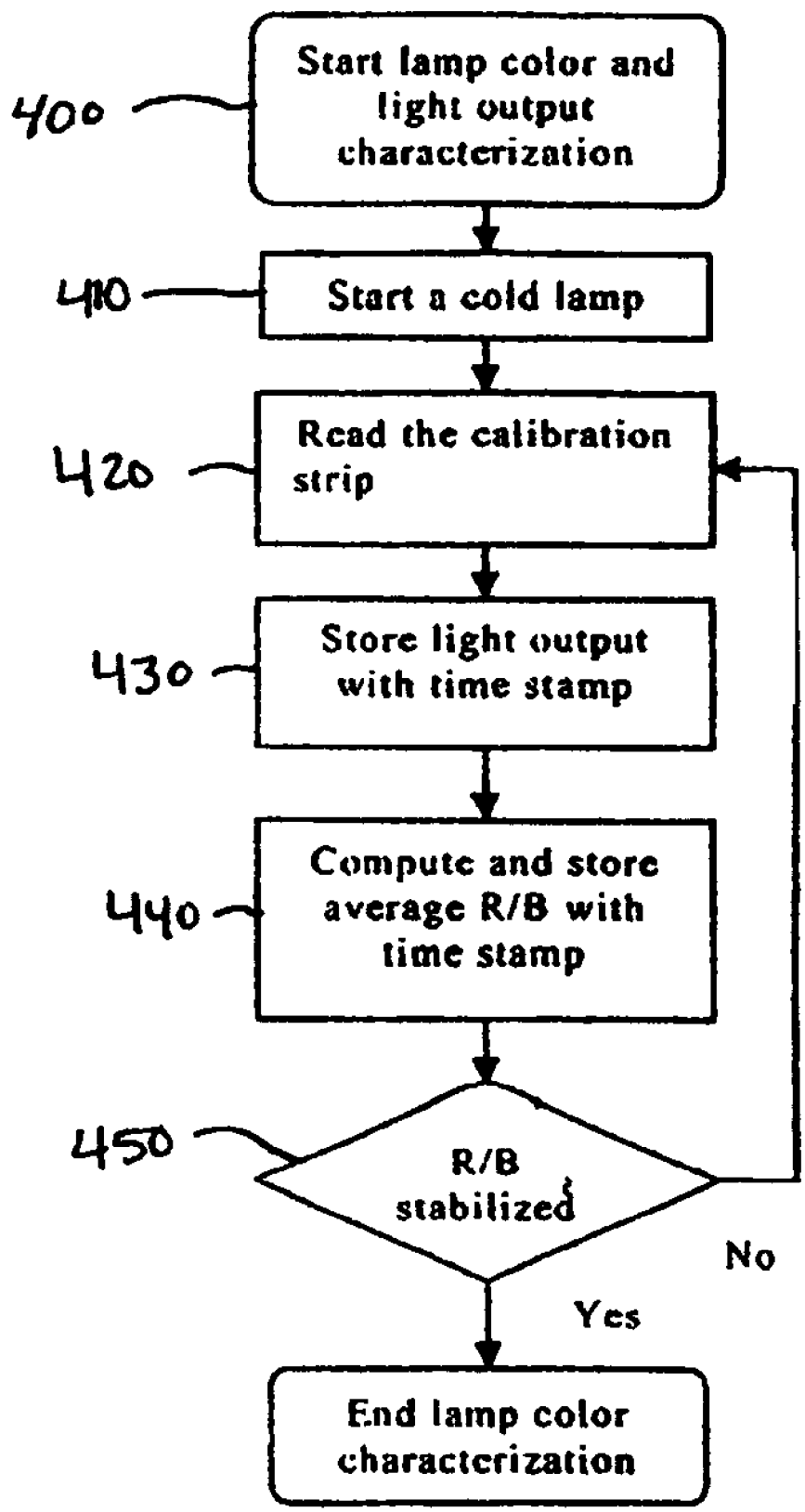
FIG. 2 is a flow chart illustrating a process for compiling calibration data according to an embodiment of the present invention.

FIG. 2 is an exemplary flow chart depicting the collection of lamp calibration data. At the start 400 of the lamp color and light output characterization process, a cold CCFL is activated (e.g. powered or turned on or resumed from sleep or suspended mode) at block 410. Shortly thereafter, calibration strip 130 is read (i.e., scanned). Light output is determined based on the signals provided by sensor 120, and light output and a corresponding time stamp is stored at block 430. The time stamp is simply the amount of time (typically in seconds) since the cold lamp was activated at block 410. In addition, light color in the form of the R/B value is determined based on the signals provided by sensor 120, and the R/B value and corresponding time stamp is stored at block 440. Next, it is determined whether or not the lamp is fully warmed-up and stabilized at block 450. If the lamp is not fully warmed-up and stabilized, steps 420-440 are repeated at selected time intervals (e.g., every second). Step 450 may comprise comparing the most-recent R/B value to one or more of the preceding R/B values. If this comparison shows little or no change in R/B values, the lamp color and characterization process may end since the lamp may be deemed fully warmed-up.

The result of the exemplary process depicted in FIG. 2 is a lamp color characterization or compilation of data correlating lamp warm-up state (in seconds) with lamp color, as well as correlating lamp warm-up state and light output. This data may then be stored in one or more look-up tables stored in memory 150. Thereafter, this stored calibration data may be used to estimate light output based on lamp color measured during a subsequent lamp warm-up.

Figure 3:
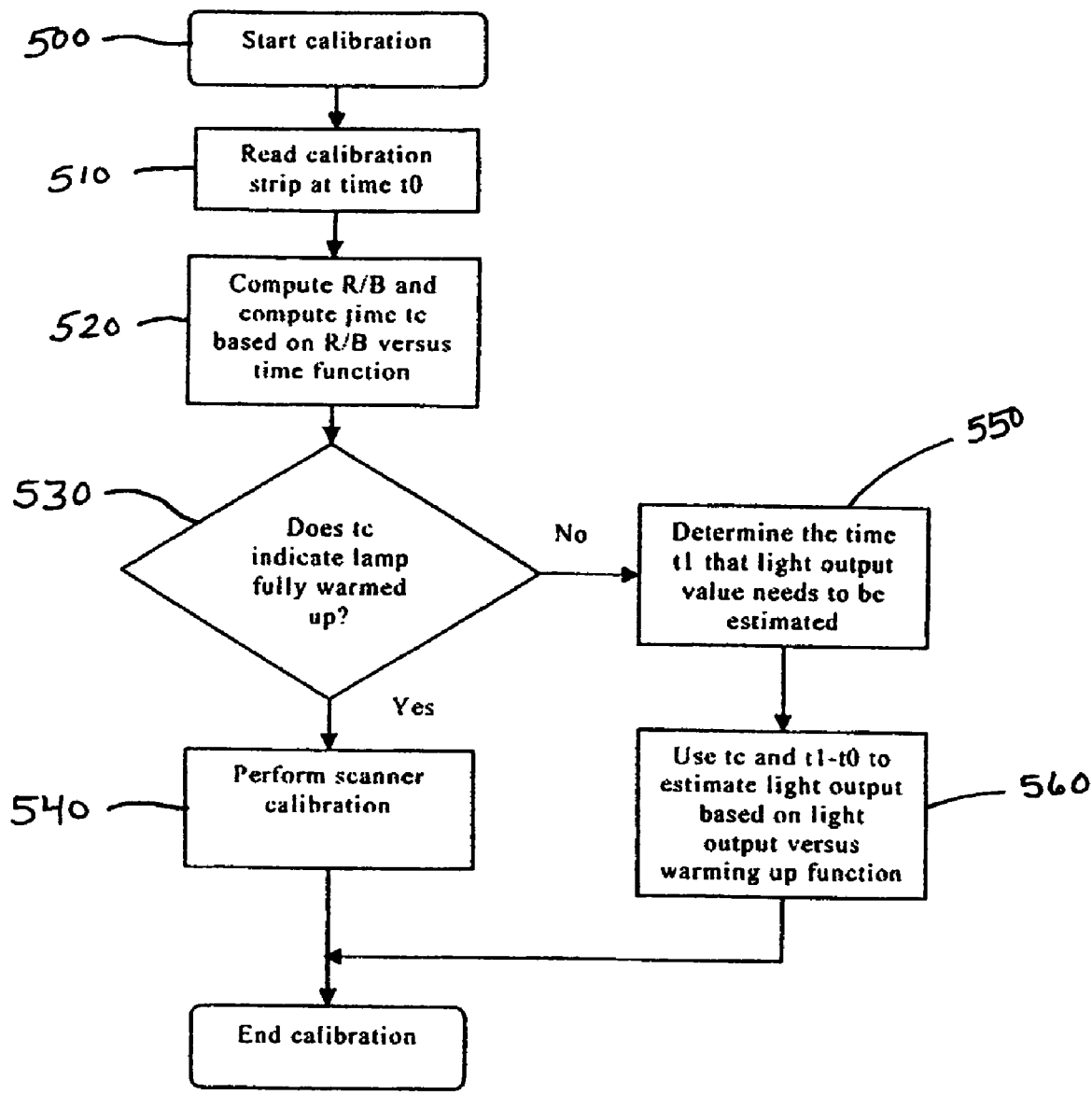
FIG. 3 is a flow chart illustrating a process for estimating light output in a scanner according to an embodiment of the present invention.

FIG. 3 is an exemplary flow chart depicting the use of previously-determined calibration data to estimate lamp output prior to the lamp being fully warmed-up. In particular, shortly after lamp 110 is activated, scanning apparatus 100 will begin the calibration process at block 500. Scanning apparatus 100 may be configured to begin such calibration immediately after lamp 110 is activated. At block 510, the calibration strip 130 is read (i.e., scanned). The time at which block 510 is performed may be designated as $t_0$, however is should be pointed out that $t_0$ does not correspond to the time at which lamp 110 was activated. The signals from sensor 120 may be used to determine the color of light emitted from lamp 110 in block 520. For example, such color of light may be represented as the R/B value, as described in the exemplary embodiment. Thereafter, the R/B value (i.e., the measured spectral characteristic) at time $t_0$ is compared to the stored data correlating R/B values and lamp warm-up state (in seconds). This comparison at block 520 provides the estimated lamp warm-up state corresponding to the measured R/B value. The lamp warm-up state may be designated as $t_c$ (in seconds), and this value is the perceived warm-up time (in seconds), as determined from the look-up table, when step 510 (the calibration scan) was performed.

If $t_c$ indicates that the lamp is fully warmed-up at step 530, the scanner is simply calibrated in the usual manner (block 540) using the data acquired at step 510. In other words, the lamp output used to adjust the gain during a subsequent scan is simply the lamp output actually measured at step 510.

If $t_c$ indicates that the lamp is not fully warmed-up, the user may still scan an image without waiting for the lamp to become fully warmed-up. When such a scan is performed, the time of the scan ($t_1$) is determined at block 550. At block 560, $t_1$-$t_0$ is calculated (in seconds), and this value is then added to $t_c$. The resulting time value (in seconds) is then compared to the stored data correlating light output and warm-up status in order to estimate the light output from the lamp at scan time $t_1$. This estimated light output is then used to adjust the gain during processing of the image data provided by sensor 120. In this manner, scanning may be performed before the lamp 110 is fully warmed-up, with the estimated light output of lamp 110 being used to adjust the image data in order to compensate for variations in light output resulting from the lamp 110 not being fully warmed-up.

Light output may be estimated once for each image (e.g., each page) which is scanned. Alternatively, light output may be estimated at multiple times during the scanning of a single image so that the appropriate gain may be applied to data acquired at different points in time during the scanning of the image.

By using the apparatus and methods of the present invention, the amount of time required to complete an acceptable first scan after turning on the CCFL is greatly reduced by estimating light output of the lamp in order to adjust the gain. This estimation is performed using a calibration scan performed shortly after the lamp is activated. It should be appreciated that the data processing steps shown in FIGS. 2 and 3 may be performed by control system 140 and/or computer system 160. In addition, the calibration data may be stored in memory 150 and/or within memory provided in computer system 160. Similarly, the application of gain on the basis of the estimated light output may be performed by control system 140 and/or computer system 160.

Having described the present invention in detail and by reference to specific embodiments thereof, it will be apparent that modifications and variations are possible without departing from the scope of the present invention defined in the appended claims. More specifically, although some aspects of the present invention may be identified herein as preferred or particularly advantageous, it is contemplated that the present invention is not necessarily limited to these aspects.

What is claimed is:

1. A method of estimating light output of a lamp in a scanner prior to the lamp being fully warmed-up, comprising:
    measuring a spectral characteristic of light emitted by the lamp at a time $t_0$ prior to the lamp being fully-warmed-up;
    determining a warm-up state of the lamp for time $t_0$ by comparing the spectral characteristic to stored data correlating the spectral characteristic and a lamp warm-up state; and
    estimating the light output of the lamp at a time $t_1$, based on the spectral characteristic, wherein $t_1$ is greater than $t_0$, and wherein estimating the light output of the lamp at the time $t_1$ comprises:
        determining a warm-up state of the lamp for time $t_1$, based on the warm-up state for time $t_0$ and the difference between $t_1$ and $t_0$; and
        obtaining the estimated light output at time $t_1$ by comparing the warm-up state of the lamp for time $t_1$ to stored data correlating the lamp warm-up state for time $t_1$ and a corresponding light output.

2. The method of claim 1, wherein the spectral characteristic comprises a ratio of detected light of a first band of wavelengths to detected light of a second band of wavelengths.

3. The method of claim 2, wherein said first and second bands of wavelengths are chosen from the group consisting of red, blue and green bands of wavelengths.

4. The method of claim 1, wherein measuring the spectral characteristic of light emitted by the lamp comprises imaging a calibration target.

5. The method of claim 1, wherein the spectral characteristic comprises a ratio of detected light of a red band of wavelengths and detected light of a blue band of wavelengths.

6. A method of scanning using a scanning apparatus, comprising:
    energizing a lamp of the scanning apparatus;
    measuring a spectral characteristic of light emitted by the lamp at a time $t_0$ prior to the lamp being fully warmed-up;
    determining a warm-up state of the lamp for time $t_0$ by comparing the spectral characteristic to stored data correlating the spectral characteristic and a lamp warm-up state;
    performing a scan at a time $t_1$ prior to the lamp being fully warmed-up and acquiring image data from the scan, wherein $t_1$ is greater than $t_0$;
    estimating the light output of the lamp at a time $t_1$ based on the spectral characteristic, wherein estimating the light output of said lamp at a time $t_1$ comprises:
        determining a warm-up state of the lamp for time $t_1$ based on the warm-up state for time $t_0$ and the difference between $t_1$ and $t_0$; and
        obtaining the estimated light output at time $t_1$ by comparing the warm-up state of the lamp for time $t_1$ to stored data correlating the lamp warm-up state for time $t_1$ and light output; and
    modifying the image data using the estimated light output.

7. The method of claim 6, wherein the spectral characteristic comprises a ratio of detected light of a first band of wavelengths to detected light of a second band of wavelengths.

8. The method of claim 7, wherein said first and second bands of wavelengths are chosen from the group consisting of red, blue and green bands of wavelengths.

9. The method of claim 6, wherein measuring the spectral characteristic of light emitted by the lamp comprises imaging a calibration target.

10. The method of claim 6, wherein the spectral characteristic comprises a ratio of detected light of a red band of wavelengths and detected light of a blue band of wavelengths.

11. The method of claim 6, wherein modifying the image data using the estimated light output comprises adjusting a gain applied to the image data.

12. An apparatus for scanning, comprising: a lamp for emitting light; a photosensor for detecting light emitted by said lamp; a memory which stores first and second sets of lamp calibration data, the first set of lamp calibration data comprising data correlating lamp warm-up state and a spectral characteristic of light emitted by the lamp, and the second set of lamp calibration data comprising data correlating lamp warm-up state and light output of the lamp; and
    a control system which determines a lamp warm-up state for a time $t_0$ by comparing measured spectral characteristics to the stored data correlating the spectral characteristics of light emitted by the lamp and the lamp warm-up state, determines a warm-up state of the lamp for time $t_1$, based on the lamp warm-up state for time $t_0$ and the difference between $t_1$, and $t_0$; and
    obtains estimated lamp light output at time $t_1$ by comparing the warm-up state of the lamp for time $t_1$ to the stored data correlating the lamp warm-up state and the light output of the lamp.

13. The apparatus of claim 12, wherein the lamp is a cold cathode fluorescent lamp.

14. The apparatus of claim 12, wherein the spectral characteristic comprises the ratio of detected light of a first band of wavelengths to detected light of a second band of wavelengths.

15. The apparatus of claim 14, wherein the first and second bands of wavelengths are chosen from the group consisting of red, blue, and green bands of wavelengths.

16. The apparatus of claim 12, wherein the spectral characteristic comprises the ratio of detected light of a red band of wavelengths and detected light of a blue band of wavelengths.

* * * * *